(12) United States Patent
Toma

(10) Patent No.: US 9,969,560 B1
(45) Date of Patent: May 15, 2018

(54) WHEEL BASED RECIPROCATING SLATS CONVEYOR SYSTEM

(71) Applicant: Hani Toma, El Cajon, CA (US)

(72) Inventor: Hani Toma, El Cajon, CA (US)

( * ) Notice: Subject to any disclaimer, the term of this patent is extended or adjusted under 35 U.S.C. 154(b) by 0 days. days.

(21) Appl. No.: 15/816,310

(22) Filed: Nov. 17, 2017

(51) Int. Cl.
*B65G 25/04* (2006.01)
*B65G 25/06* (2006.01)
*B65G 47/82* (2006.01)

(52) U.S. Cl.
CPC .......... *B65G 25/065* (2013.01); *B65G 47/82* (2013.01); *B65G 2201/04* (2013.01); *B65G 2812/12* (2013.01)

(58) Field of Classification Search
CPC ....... B65G 25/00; B65G 25/04; B65G 25/065
USPC ....... 198/750.01, 750.2, 750.3, 750.5, 750.6, 198/750.14
See application file for complete search history.

(56) References Cited

U.S. PATENT DOCUMENTS

| | | |
|---|---|---|
| 3,662,906 A | 5/1972 | Christensen |
| 3,918,367 A | 11/1975 | Alimanestianu |
| 4,284,191 A | 8/1981 | Lavau |
| 4,330,057 A | 5/1982 | Binns |
| 4,727,978 A | 3/1988 | Hallstrom, Jr. |
| 4,856,645 A | 8/1989 | Hallstrom, Jr. |
| 4,987,834 A | 1/1991 | Peck, Jr. |
| 5,076,172 A | 12/1991 | Grimm |
| 5,222,593 A | 6/1993 | Quaeck |
| 5,228,556 A | 7/1993 | Quaech |
| 5,310,044 A | 5/1994 | Quaeck |
| 5,323,894 A | 6/1994 | Quaeck |
| 5,325,957 A | 7/1994 | Wilkens |
| 5,335,778 A | 8/1994 | Wilkens |
| 5,346,056 A | 9/1994 | Quaeck |
| 5,355,994 A | 10/1994 | Foster |
| 5,402,878 A | 4/1995 | Lutz |
| 5,489,018 A | 2/1996 | Foster |
| 5,540,322 A | 7/1996 | Foster |
| 5,547,067 A | 8/1996 | Foster |
| 5,588,522 A | 12/1996 | Foster et al. |

(Continued)

OTHER PUBLICATIONS

Website for Keith Walking Floor (Jul. 6, 2017) http://www.keithwalkingfloor.com/.

(Continued)

*Primary Examiner* — James R Bidwell
(74) *Attorney, Agent, or Firm* — Reem Allos

(57) ABSTRACT

In a walking floor conveyor, an arrangement of panels lined longitudinally in a side-by-side fashion are organized into at least two correlating groups of panels. At least two panels within each group. Each panel grouping is propelled and retracted in a reciprocating manner, each by a hydraulic cylinder. The panels comprising wheel receptacles underneath the panels and at least one wheel fitted within a wheel receptacle to allow for forward and backward movement along a wheel support beam. These reciprocating panels supported by a series of wheel support beams, interior support beams and side support beams. These side support beams are at their tallest in the back and shortest in the front to provide a slant allowing for a flow of cargo and liquid runoff captured within a plurality of panel drains located between the panels towards a frontally placed auger designed for the assistance of cargo discharge.

20 Claims, 12 Drawing Sheets

(56) References Cited

U.S. PATENT DOCUMENTS

| | | |
|---|---|---|
| 5,850,905 A | 12/1998 | Foster |
| 5,934,445 A | 8/1999 | Foster et al. |
| 6,348,025 B1 | 2/2002 | Schonenberger |
| 6,454,079 B1 | 9/2002 | Teramoto |
| 6,513,648 B1 | 2/2003 | Hallstrom et al. |
| 6,640,958 B2 | 11/2003 | Postlmayr |
| 6,675,949 B1 | 1/2004 | Gonzalez Alemany |
| 6,782,994 B1 | 8/2004 | Foster |
| 7,028,832 B2 | 4/2006 | Foster et al. |
| 7,063,205 B2 * | 6/2006 | Tomassoni ............. B65F 3/24 198/750.2 |
| 7,353,932 B2 | 4/2008 | Aulanko |
| 7,398,873 B2 | 7/2008 | Foster et al. |
| 7,461,738 B1 | 12/2008 | Foster et al. |
| 7,510,071 B2 | 3/2009 | Foster |
| 7,556,141 B2 | 7/2009 | Foster et al. |
| 7,604,109 B2 | 10/2009 | Foster et al. |
| 7,789,218 B2 | 9/2010 | Foster et al. |
| 7,815,037 B2 | 10/2010 | House et al. |
| 8,006,828 B2 | 8/2011 | Stout et al. |
| 8,083,052 B2 | 12/2011 | Drago et al. |
| 8,424,674 B2 | 4/2013 | Drago et al. |
| 8,692,473 B2 | 4/2014 | West |
| 8,708,636 B2 | 4/2014 | Jackson |
| 9,090,193 B2 | 7/2015 | Cook et al. |
| 9,278,812 B2 | 3/2016 | Feigner et al. |
| 2004/0222068 A1* | 11/2004 | Meyer ................. B65G 25/065 198/750.2 |
| 2005/0103600 A1* | 5/2005 | Wilkens ............. B65G 25/065 198/750.1 |
| 2005/0118008 A1* | 6/2005 | Gabe ...................... B65F 3/24 414/525.1 |
| 2006/0081444 A1* | 4/2006 | Meyer ................. B65G 25/065 198/750.14 |
| 2008/0304947 A1 | 12/2008 | Stout et al. |
| 2009/0078541 A1 | 3/2009 | Foster et al. |
| 2010/0025193 A1 | 2/2010 | Delamarter et al. |
| 2012/0138430 A1 | 6/2012 | Drago et al. |
| 2015/0183587 A1 | 7/2015 | Toth |
| 2015/0217945 A1 | 8/2015 | Webster et al. |

OTHER PUBLICATIONS

Youtube Video for Keith Walking Floor (Jul. 6, 2017) https://youtu.be/dWYPXkrROo0.

* cited by examiner

WHEEL BASED RECIPROCATING SLATS CONVEYOR SYSTEM

FIELD OF THE INVENTION

This invention relates to improvements in reciprocating slat conveyor systems.

BACKGROUND

Although there exist reciprocating slat conveyor systems in the marketplace, these existing systems lack the incorporating of a proper drainage system to effectively facilitate the conveying of material which may release excess liquid or runoff.

Moreover, the existing reciprocating slat conveyor systems may also lack a level of durability, as the components are made of plastics and corrodible metals which are prone to rusting corrosion.

Also, the existing reciprocating slat conveyor systems are complex, difficult and expensive to maintain without a maintenance contract with the original manufacturer.

Lastly, the existing reciprocating slat conveyor systems are not designed to allow for gradual sloping, but rather are designed to convey items in a flat, uniform, horizontal surface.

SUMMARY

Comprised of a series of reciprocating slats, the disclosure provides a reciprocating slat conveyor system that acts as an effective conveyor of ice or other materials. The illustrations provide for nine panels, wherein less or more panels may be utilized without departing from the scope of the invention, are oriented in a longitudinal position, with the motion of propulsion and retraction carried out by hydraulic cylinders; this propulsion and retraction is the physical movement which defines the reciprocating movement that occurs during the functioning of the wheel based reciprocating slats conveyor system.

In an exemplary embodiment, the nine panels do not enact this reciprocation in a simultaneous manner, rather the nine panels are allotted into specific "groups" wherein there may be three groups, having three panels per group. The wheel based reciprocating slat conveyor system would function similarly if there are at least two groups, each group comprised of at least two slats per group. Definitively, these groups are defined in a series of A, B, C, wherein group A represents the first, fourth, and seventh panels, group B represents the second, fifth, and eighth panels, and group C represents the third, sixth, and ninth panels. There exists three hydraulic cylinders, with one hydraulic cylinder assigned per group. In this, it may be concluded that there is an A hydraulic, B hydraulic, and C hydraulic. The hydraulic associated with the correlating group acts as the propulsion and retraction unit per group in order to facilitate the reciprocation of the panels, respectively. The respective panel groups reciprocate in a staggered manner, in which panel group A propels forward firstly with the assistance of hydraulic A, the forward motion resulting in a shifting forward of approximately six inches. This then is followed by a mirror movement occurring amongst the group B of panels, and concurrently the C panels. Once each group has successfully been propelled forward individually, collectively they will retract back approximately six inches. This process will proceed in a repetitious manner, leading to a reciprocation of the panels. This reciprocation facilitates the movement of cargo across the top of the nine panels. In order to further orient this wheel based reciprocating slat conveyor system towards the specific cargo, inserted between the links of each of the nine panels are a series of drains which run the longitudinal length of the outer and inner sides of each panel, with the exception of no drain on the outermost left side of the most outer left panel. Furthermore, the wheel based reciprocating slats conveyor system is oriented in a downward diagonal slant, with the side support beams becoming increasingly taller as they line towards the back of the panel series. This leads to the front of the nine panels being closer to the ground than the back of the nine panels, allowing the gravitationally supported flow of water outward towards the loci of the dispensing of ice, and away from the hydraulic components.

Generally, what allows this conveyor system to be so efficient is the design of the wheel receptacles running along the bottom of each of the slats. These wheel receptacles allow for wheels to be maintained therein, which ultimately rest on top of wheel support beam. The wheel support beams may run the entire longitudinal length of the each of the slats, or they may reside as specific locations above the wheel support beams. Moreover, the wheel support beams may be maintained below the horizontal flat surface areas of a slat or may be embedded within a bottom of a slat to allow for thinner or more flush interface between the slats, the intermediary wheel, and the wheel support beams. The wheels maintained within the wheel receptacle and resting on the wheel support beams allow for the propelling and retraction of the slats by the hydraulic cylinders.

Moreover, group panel connectors, fixed at equally spaced intervals longitudinally along the conveyor system, found underneath the slats, connects slats of the same grouping, connected via a group arm link, and allow the group arm link connected to a hydraulic cylinder associated with a single group to control the movement of multiple group panel connectors of the same grouping.

DETAILED DESCRIPTION

In one embodiment of the disclosure, a reciprocating slat conveyor system incorporating a drainage system, a sloped design, and wheel based reciprocating slats design.

On advantage of the disclosed reciprocating slat system is that it incorporates and maintains a proper drainage system effective for facilitating the conveying of materials which may release excess liquid or runoff.

Also, the sloped design allows for contents received atop of the reciprocating slats to be transported in a more efficient manner than traditional reciprocating slats designed to be primarily fixed in a flat, horizontal layout.

Also, the wheel based design to allow for slats to move forward and backwards is groups in a uniform manner provides efficient design and lower maintenance costs than more complicated reciprocating slat conveyor system utilizing custom made parts.

Moreover, another advantage of the disclosed reciprocating slat system is that it's maintains a construction of stainless steel and aluminum, which is not prone to rusting and corrosion. The durable build of stainless steel and aluminum, with plastic only maintained as insulation within the panels, minimizes the possibility of broken or corroded parts.

Furthermore, the simple and straightforward functioning as well as series of compartmentalized parts allows for an easier and cost effective repair if faced with the need for maintenance or repair.

Figure 1:
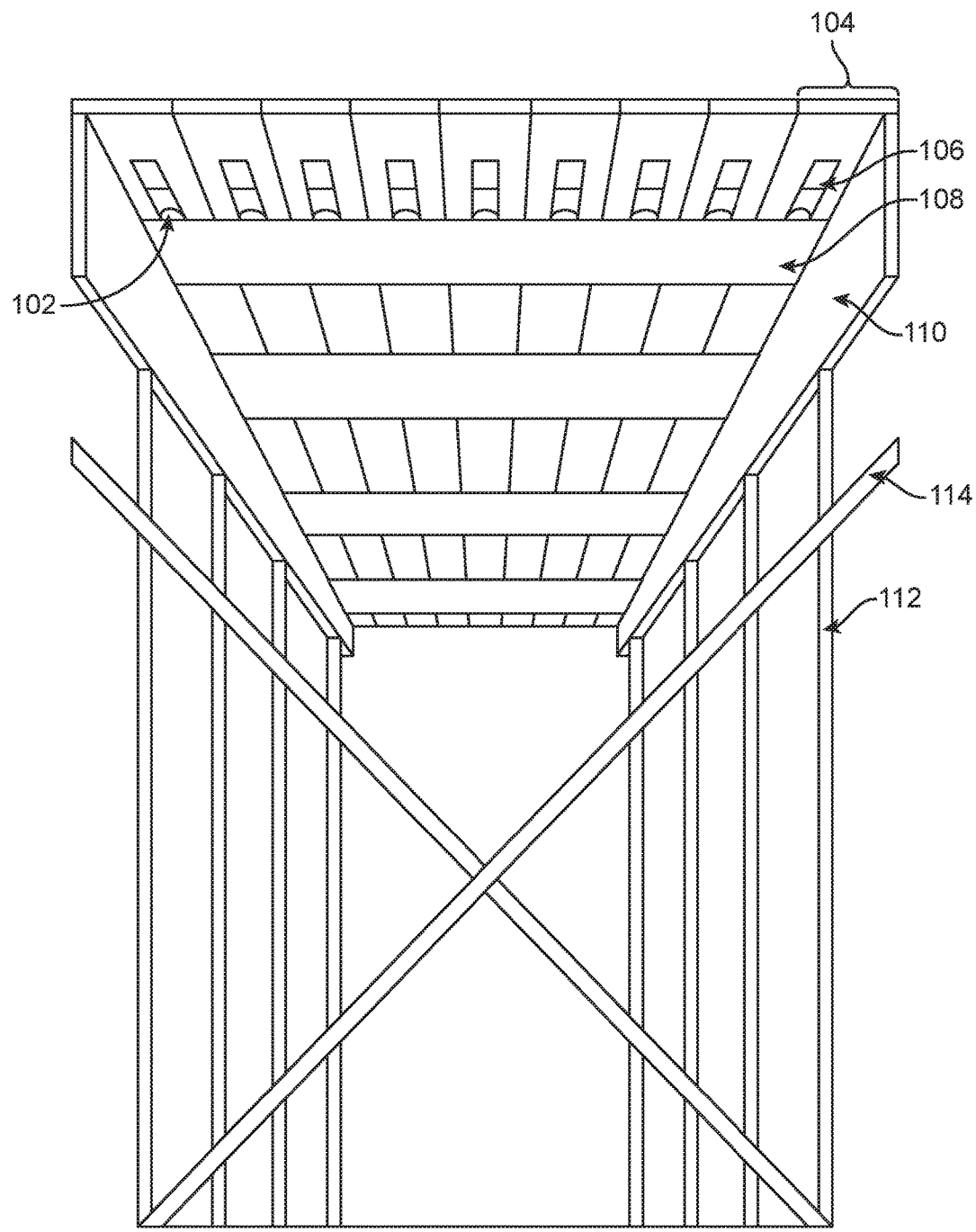
FIG. 1 is an exemplary pictorial view of the reciprocating slats conveyor system from a frontal, underside position, revealing the series of support beams and underside of the nine panels, including the side support beams, interior support beams, wheel support beams, cross support beams, and wheel receptacles.

FIG. 1 illustrates the preferred embodiment of the wheel based reciprocating slats conveyor system. A series of nine panels organized vertically reciprocate in sets of three in order to facilitate the movement of ice. There rests a series of beams and side supports beneath the panels oriented for load support. All components of the wheel based reciprocating slats conveyor system are comprised of aluminum, steel, or other durable metal materials, with exception of optional plastic or foam insulation that is out of sight, within the nine panel pieces.

Organized longitudinally rest nine panels or slats, for which a single panel is identified as panel 104 in FIG. 1, all supported by a series of five support beams 112 set beneath the panels 104 horizontally, known as the wheel support beams 108. These horizontally organized support beams may be called the wheel support beams 108 in that they facilitate the movements of the panels 104 during the functioning of the reciprocating slats conveyor system. There are five wheel support beams 108 organized equidistance from each other beneath the nine panels 104. Illustrated supporting the wheel support beams 108 are the interior support beams 110, which are organized longitudinally down the outer left edge and outer right edge of the wheel support beams 108.

The interior support beam 110 on the right extends from the top outer right corner of the most forward wheel support beam 108, extending back onto the outer right corner of the furthest back wheel support beam 108. The left interior support beam 110 extends from the outer left corner of the most forward wheel support beam 108, extending back onto the outer left corner of the furthest back wheel support beam 108. The left interior support beam 110 is in contact with all outer left wheel support beam 108 corners as it extends from front to back, and the right interior support beam 110 is in contact with all outer right wheel support beam 108 corners as it extends from front to back.

Supporting the left and right interior support beams 110 are a series of side support beams 112. There are five side support beams 112 set beneath the right interior support beam and five side support beams 112 set beneath the left interior support beams 110. The side support beams 112 are lined up vertically, and each side support beam aligns with the outer edge of a correlating wheel support beam 108 oriented in the same location below which the interior support beam 110 makes contact with the outer corner of the wheel support beam 108.

Therefore, each side support beam 112 creates a 90 degree angle in relationship to the interior support beam 110 and wheel support beam 108 nexus. The alignment of the side support beams 112, in relation to the horizontal wheel support beams 108, are oriented in order to support load bearing during the use of the wheel based reciprocating slats conveyor system as well as to support the weight of the reciprocating slats conveyor system itself.

In order to further reinforce the weight of the wheel based reciprocating slats conveyor system as well as support the structure, also illustrated are cross support beams 114. The cross support beams 114 are oriented diagonally between a correlating right and left side support beam 112. Each side support beam 112 is connected to a cross support beam 114, with the top of the cross support beam 114 being bolted into the top of the right side support beam 112, and the bottom of the cross support beam 114 being bolted into the bottom corner of the left side support beam 112. The side support beams 112, being the right and left beams, which the cross support 114 beam is bolted into, must be directly parallel to each other.

Furthermore, there is a second cross support beam 114 which is bolted into the top of the left side support beam 112, with its bottom portion bolted into the bottom of the right support beam 112. With two cross support beams 114 being anchored into the corners of each parallel set of side support beams 112, it forms an "X" positioning between each parallel resting sets of side support beams 112; sets referring to a parallel pair of left and right side support beams 112. There are a series of five sets of side support beams 112, and therefore there are five diagonally oriented cross support beam 114 "X" formations that ascend bellow the lower half of the wheel based reciprocating slats conveyor system.

Further illustrated in FIG. 1 are also the wheel receptacle 106. Beneath each of the nine panels 104 there sits a wheel receptacle 106 in which the wheels 102 may slide within in order to facilitate the reciprocation of the panels 104. The wheel receptacle 106 may run the length of the under-side of each panel in a longitudinal manner or separately occupy the volume of space above a wheel 102 resting atop a wheel support beam 108, and they are centered in the middle of each panel 104. They rest between the panels 104 and the wheel support beams 108 in order to elevate the panels off of the wheel support beams 108 in an effective manner.

Figure 2A:
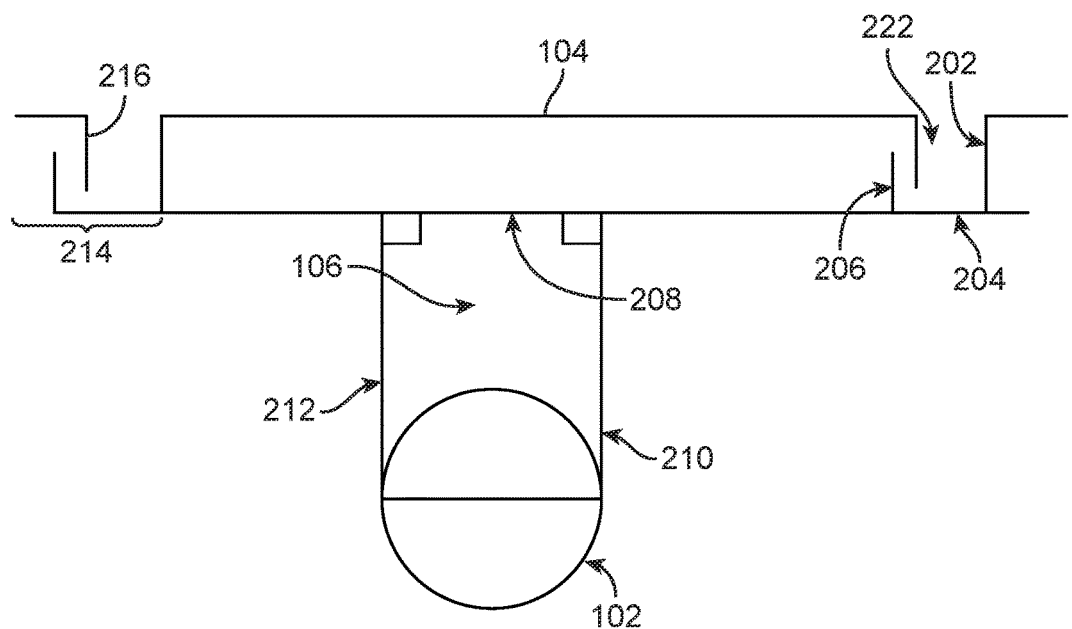
FIG. 2A is an exemplary enlarged scale view of the drainage and linkage systems inserted between panel connections, the wheel receptacle and accompanying components, all from a frontal introspective position.

Illustrated in FIG. 2 is the precise design of the wheel receptacle 106. The wheel receptacles 106 are comprised of a wheel panel left wall 212, which is the outer left side of the wheel receptacle 106, and a wheel panel right wall 210, which is the outer right side of the wheel receptacle 106.

The wheel panel left wall 212 and wheel panel right wall 210 are vertically oriented in relation to the panel 104 it is attached to, creating a 90 degree angle on either upper corner connection it maintains with the panel 104. The wheel panel left wall 212 is three inches in height, with the wheel panel right wall 210 being the same dimensions and three inches in height. The wheel panel right wall 210 and well panel left wall 212 are connected to the panel 104 by the wheel panel connection 208, which acts as the ceiling to the wheel receptacle 106. The wheel panel connection 208 rests flush to the bottom of the panel 104 itself, with the wheel panel left wall 212 and right wall 210 being anchored into the wheel panel connection 208 outer left side and outer right side. This formation creates square formational orientation, with the front, back, and bottom of the structure open in order to facilitate the wheel 102. The wheel rests between the left wheel panel wall 212 and right wheel panel wall 210, and it maintains a diameter of two inches.

The wheel receptacle 106 may be comprised of wheel panel connection 208, wheel panel right wall 210, wheel panel left wall 212, having a wheel 102 along it's bottom, and a panel 104 along it's top portion. The wheel 102 within the wheel receptacle 106 rests between the wheel panel left wall 212 and the wheel panel right wall 210, and may be maintained by a connector threaded through the middle of the wheel.

FIG. 2 also includes an illustration of the panel itself. Each of the nine panels are 8 inches in width. Each panel is linked together through a series of drainage canals which are designed to facilitate the drainage of excess water due to melted ice during the functioning of the wheel based reciprocating slats conveyor system.

The panels 104 each have a hook on their furthest right side, this being the drainage upper link 216. Concurrently, the left side of each panel maintains an extension from the bottom that then hooks up at a 90 degree angle to form a structure known as the drainage under link 214. The function of the drainage upper link 216 is to rest within the space provided by the drainage under-link 214, concurrently creating a hooking of the panels 104 together.

Illustrated in the drainage under link 214 are the portions that comprise its entirety. The drainage under link 214 has a one inch interior drain wall 202. This interior drain wall 202 is the outer left wall which extends down the left side of the entire panel. This interior drain wall 202 is the same height as the panel 104, and acts as the outer left side of the panel structure.

Connected to the interior drain wall 202 is the drain basin 204. The drain basin 204 sits horizontally and extends out from the bottom of the panel, continuing down the vertical length of the panel. The drain basin rest flush against the bottom of the panel floor and has a one inch horizontal length.

Extending upward from the outer left edge of the drain base is the exterior drain wall 206. The exterior drain wall 206 acts as the hooking component for the panel structure, and extends up straight in a vertical manner for half an inch of distance. The exterior drain wall 206 also continues longitudinally down the entire length of the panel. The exterior drain wall 206 structure creates a 90 degree angle with the drain base 204, sitting straight up.

The drainage upper link 216 then is positioned straight down in a vertical manner in order to hook over the exterior drain wall 206. The drainage upper link 216 is also a half an inch in height and is positioned in a ninety degree angle in relation to the top portion of the panel. It extends downward from the right end of the panel, and without touching the exterior drain wall overlaps said exterior drain wall 206. It does not touch the drain exterior drain wall 206 nor the drain base 204 at any point, rather hovering in a hooking position over the top of the exterior drain wall 206. This forms an overlapping link between panels.

Figure 2B:
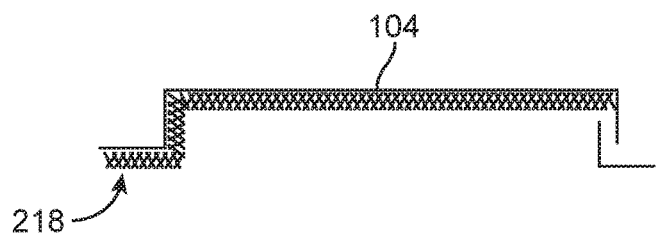
FIG. 2B is an exemplary enlarged scale view of the drainage and linkage systems illustrating the interior panel padding.

Illustrated in FIG. 2B is the insulation within the panels as well. Within each of the nine panels 104 there is a foam or plastic padding 218 that rests beneath the surface of the panel 104. This padding is aligned along the underside of the drain base 204, extending up the inside of the interior drain wall 202, and across the underside of the eight inch panel 104. This padding may not be visible as it may be maintained within the panel components. The foam or plastic padding 218 may act as a thermal layer disallowing transfer of heat/cold from top surface of the panel to it's bottom surface. Also, the foam or plastic padding 218 may act as a reasonable and cost effective means to reduce wear and tear of the bottom portion of the panel as the bottom portion of the panels may rub against other materials during the execution of the system.

The panel drain 222 is confined within the area maintained between the interior drain wall 202, the drain base 204, and exterior drain wall 206. The panel drain allows liquid to drain from the top portion of the panel 104 to the cavity of the panel drain 222 to capture excess or run-off liquid.

Figure 2C:
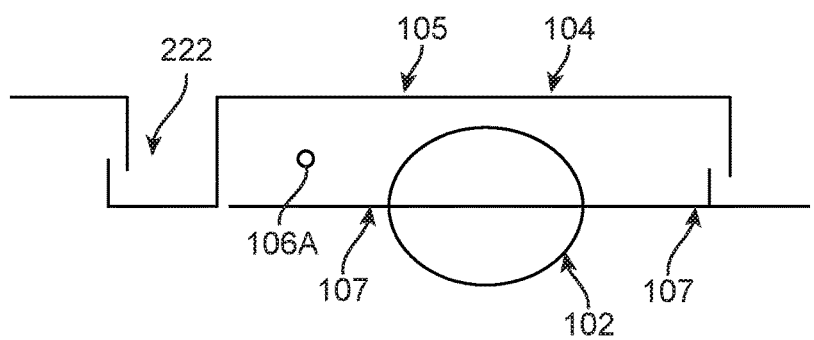
FIG. 2C is an exemplary enlarged scale view of the drainage and linkages system illustrating an embedded wheel receptacle.

FIG. 2C an exemplary enlarged scale view of the drainage and linkages system illustrating an embedded wheel receptacle 106A. The panel 104 having a top surface 105, a side drain panel 222 on at least one side, and an embedded wheel receptacle 106A occupying the space below the top surface 105 and above the wheel harness that maintains a wheel 102. In this embodiment, the embedded wheel receptacle 106A may run the length of the under-side of each panel in a longitudinal manner or separately occupy the volume of space above a wheel 102 resting atop a wheel support beam 108.

Figure 3A:
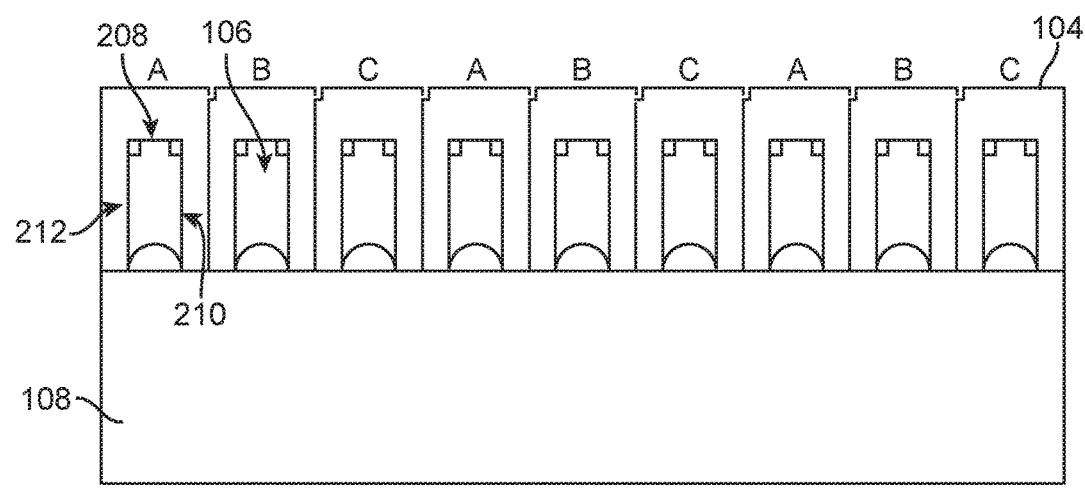
FIG. 3A is an exemplary view of the underside of all nine panels and their respective wheel receptacles from the first wheel support beam intersection and forward.

FIG. 3A functions to illustrate the preferred embodiment of the panels as described previously. FIG. 3 illustrates the underside of the nine panels in order to convey the setting of the wheel receptacles 106 as they are attached to the panels 104. The wheel receptacles 106 extend the entire vertical length of panels in a longitudinal manner, with each panel 104 being assigned a wheel receptacle 106. The wheel receptacle 106 is set between the panel 104 and the wheel support beam 108. The purpose of the wheel support beam 108 is to provide the surface area for which the wheels 102 subsequently roll across in order to facilitate the reciprocation of each of the panels 104. The wheel receptacles 106 maintain the longitudinal movement of the wheels across the top surface of the wheel support beam 108 during the reciprocation of the nine panels. Each wheel support beam 108 is six inches in width in order to support the forward and backward movement of the wheel 102, and extends the length in a latitudinal manner across all nine panels.

All nine panels share each of the five wheel support beams 108, as all nine panels do make contact with all five wheel support beams 108 for functional purposes of the preferred embodiment, but each panel 104 does maintain its own assigned wheel receptacle 106. A single panel 104 may maintain a plurality of wheel receptacles 106, which are spaced equidistance from each other beneath the longitudinally organized panels, wherein each wheel receptacle 106 having a wheel 102 which rolls along one a wheel support beams 108. Each wheel 102 within the wheel receptacle 106 rests atop a correlating wheel support beam 108, and when reciprocation of the panels 104 occur, the wheels 102 are set to slide across the entirety of the six inch width of the wheel support beams 108 in a back and forth motion.

Therefore, when the reciprocation of the slats occurs, the plurality of wheels within the plurality of wheel receptacles 106 of each panel, with one wheel 102 per wheel support beam 108 per panel 104, will slide forward the six inch width of the wheel support beam 108, and concurrently slide back the six inch width of the wheel support beams 108.

Also in FIG. 3 is a defining of the three separate groupings of the panels which reciprocate with one another in respective sets of three. The panels labeled "A", from the left to right, being the first panel, the fourth panel, and the seventh panel, illustrating the "A Group". Following are the "B" labeled panels, from left to right being the second, fifth, and eighth panels, illustrating the "B Group". Finally are the "C" labeled panels, from left to right being the third, sixth, and ninth panels, illustrating the "C Group".

Figure 3B:
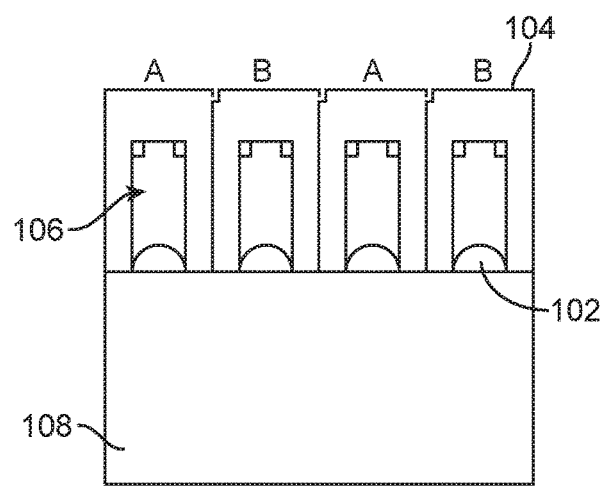
FIG. 3B is an exemplary view of the underside of all 4 panels in a wheel reciprocating slat conveyor system comprised of at least two groups of at least two slats per group.

These groupings of panels are designated because each grouping of panels, being the Group A, Group B, and Group C, are the panels which will reciprocate with each other as individual groups. Optionally, the reciprocating slat conveyor system may function properly if it maintains at least two group of at least two slats per group as shown in FIG. 3B. Also, as shown in FIG. 3B, the slats may be arranged wherein the slats are devoid of panel drain 222.

Figure 4:
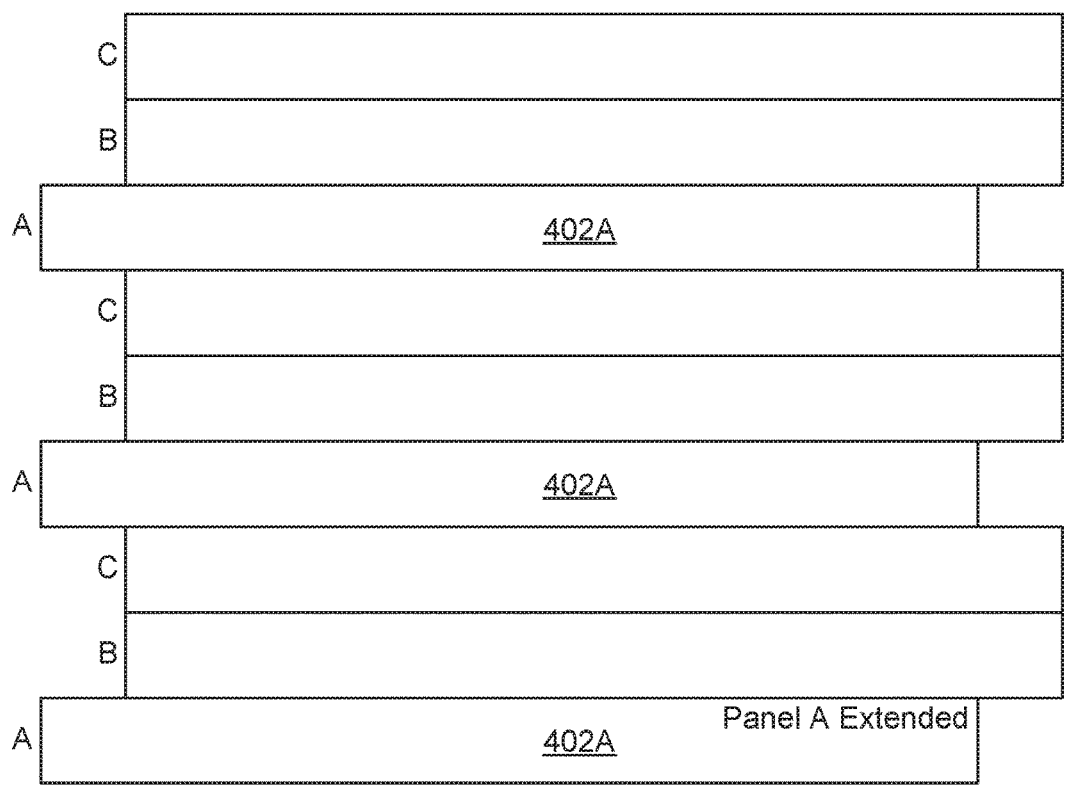
FIG. 4 is an exemplary view showing group A panels advanced forward six inches, with group B and C panels maintained stationary.
Figure 5:
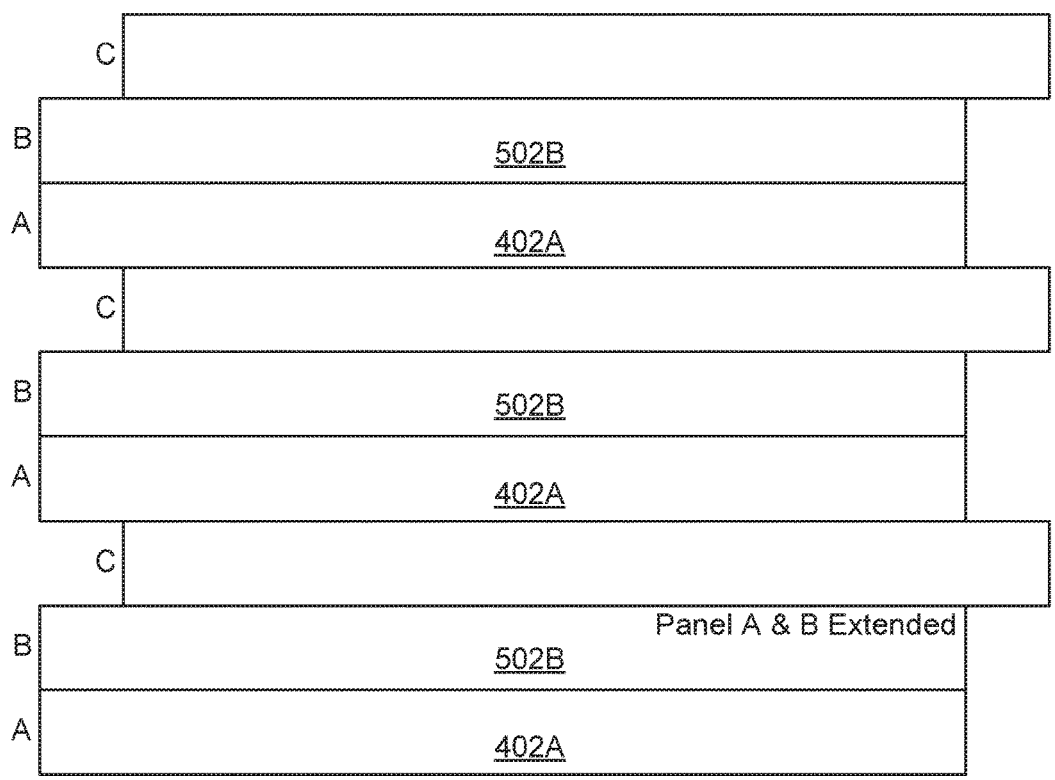
FIG. 5 is an exemplary view showing both group A and B panels advanced forward six inches, with group C panels maintained stationary.
Figure 6:
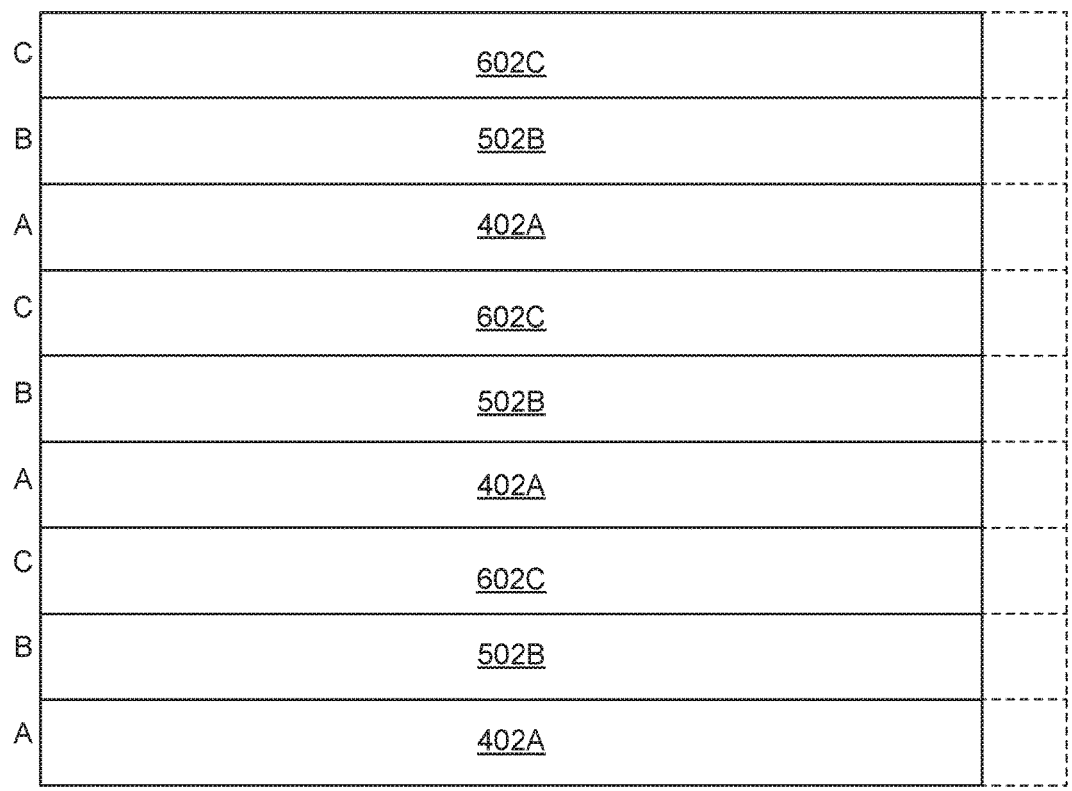
FIG. 6 is an exemplary view showing all panel groups in both their fully advanced as well as retracted stationary positions.

FIGS. 4-6 illustrates the manner in which the panels reciprocate. Within FIG. 6, the dashed lines across the bottom represent the setting of the panels when they are in a stationary and unmoved position. The dashes represent the location the panels are placed in when shifted back and unreciprocated.

FIG. 4 then shows the location of panel Group A when the panels have been reciprocated forward. Group A is the first of the three groups to be shifted forward during the functioning of the wheel based reciprocating slats conveyor system. The Group A panels 402A are reciprocated forward with the assistance of a hydraulic pump A 910A. They are slowly pushed forward six inches. This occurs when the wheels 102 within the wheel receptacles 106 are slid forward the six inch distance across the top of the wheel support beams 108. Therefore FIG. 4 represents the Group A of panels shifted forward six inches.

FIG. 5 then shows the accompanying shifted movement of the Group B of panels. Once the Group A of panels 402A have successfully shifted forward, they will stay in that position as the Group B of panels 502B shifts forward in the same exact manner. The wheels 102 (not shown) beneath the Group B of panels slide through the wheel receptacles 106, and move forward the six inches across the top of the wheel support beams 108. The Group B panels 502B will then be flush against the Group A panels 402A and appear side by side as they have, at that point, shifted forward the same exact six inch distance.

Also illustrated in FIG. 6 is the fully shifted forward positioning of the panels. Once both Group A panels 402 and Group B panels 502 have shifted forward, the Group C panels 602C begin the same process. The group C panels 602C are shifted forward six inches with the facilitation of the movement of the wheels through the wheel receptacles 106 and across the surface of the wheel support beams 108. This shifting movement will result in all three panel grouping being shifted forward six inches compared to their previous resting position. In the case of the panels being completely shifted forward, the dashed space illustrated in FIG. 6 is the six inch area in which all nine panels have shifted out of.

Upon the completion of the shifting of the nine panels forward, rather than in their respective groupings, all panels are then shifted back six inches simultaneously. This simultaneous shifting back will release the panels back into their original resting position by which they are all resting side by side against each other. The reciprocation process will then begin again, where the panels with shift in their respective groups forward. This process will continue repeatedly in order to facilitate the movement of cargo or materials across the top of the platform.

Figure 7:
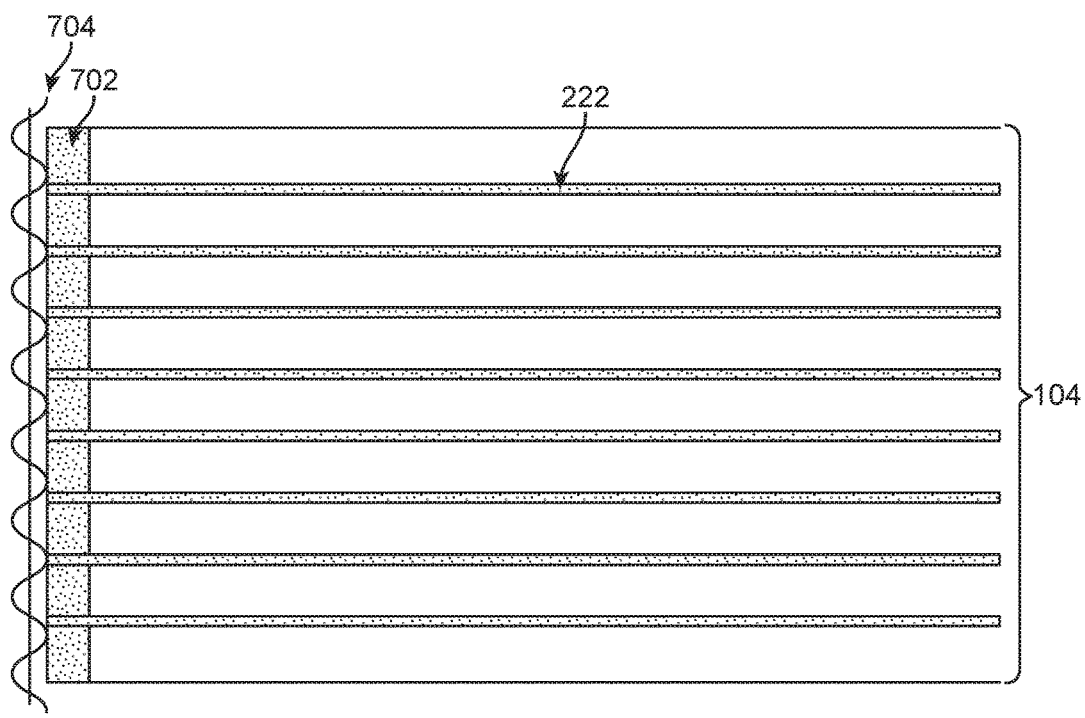
FIG. 7 is an exemplary birds eye view of the nine panels in a stationary view, as well as the auger, primary drain, and panel drain.

FIG. 7 shows the resting position of the panels as they are all shifted back into their respective resting position. FIG. 7 is a bird's eye view of all nine panels resting side by side in relation to one another as they are designated to be in the preferred embodiment.

Also, illustrated in FIG. 7 are the panel drains 222. These panel drains 222 are designed for the collecting of excess melted liquids and are organized between each slat. The farthest left slat does not have a panel drain on its left side, but the furthest right slat does have a panel drain on its right side. This leads to a total of nine panel drains 222 as shown in FIG. 7 in the preferred embodiment.

In FIG. 7, illustrated resting at the front end of the slats is an auger 704 which is designed to facilitate the removal of ice from the platform. Between the auger and the end of the slats is a primary drain 702, which the collective water from each panel drain empties towards.

Referring back to FIG. 2, the drainage upper link 216 and drainage under link 214 form a gap between each of the nine panels in order to provide a pathway for excess melted water or liquids, as well as a method of linking the panels together. Therefore the panel drains illustrated in FIG. 7 are a birds eye view of the gap formed due to the linkage of panels as illustrated in FIG. 2.

FIG. 7 shows panel drain 222 on at least one side of each panel. However, alternative embodiments are contemplated wherein the drain panel 222 is omitted from the parallel panels 104 as shown in FIG. 3B. Optionally, in an alternative embodiment, wherein the parallel panels 104 having panel drain 222 on each side of the panel 104, as substantially shown in FIG. 7, from a high level view.

Also, linking the panels together are panel connections which rest beneath the panels. These panel connections are specifically designed to facilitate the linking of panel groups, being the connection that allows the reciprocation of Group A, Group B, and Group C together respectively.

Figure 8:
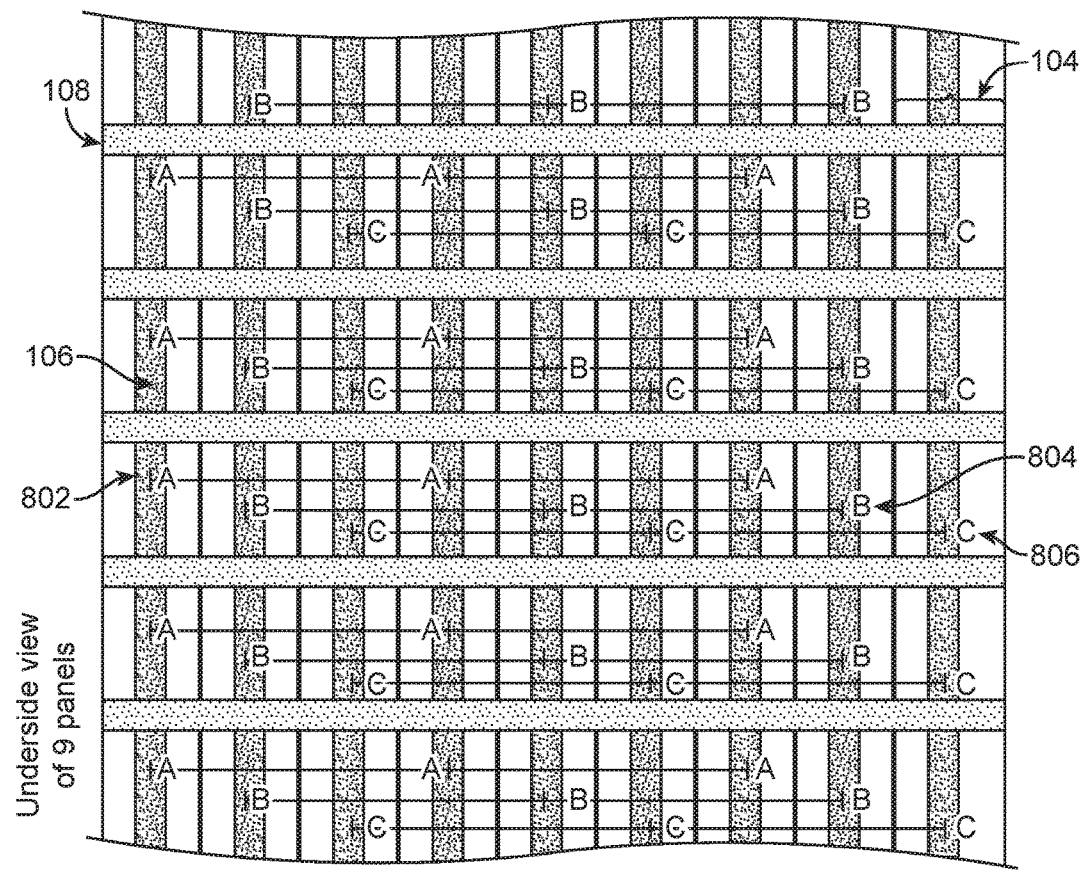
FIG. 8 is an exemplary view showing a full underside view of all nine panels and all five wheel support beams, with each panel groups' correlating panel connections clearly labeled.

These connections are clearly illustrated in FIG. 8. FIG. 8 contemplates three group panel connectors, but the disclosure contemplates at least two group panel connectors sufficient to control a reciprocating slat conveyor system. FIG. 8 shows the underside of each of the nine panels 104 as they rest longitudinally next to one another. Pictured are the wheel receptacles 106 extending the vertical length down the center of each panel, as well as the five wheel support beams 108 that are spaced equidistance from one another, horizontally oriented across the latitudinal width of the nine panels 104. The wheel receptacles 106 as shown in FIG. 2 illustrate that they maintain a wheel 102 while along the wheel support beam 108, but otherwise, the wheel receptacles 106 may be maintained for the entire length of the panel 104 in the areas outside the wheel support beam 108 without a wheel 102 along their bottom portion.

Between each wheel support beam 108 are the panel grouping connections. These connections are staggered as they are set to connect just the panels assigned to each respective group. The panel connections are flat plates which rest flush against the wheel receptacles 106 and are then bolted into the wheel receptacles 106 with the integration of a "T" connector (not shown).

There are five staggered panel connection groupings, as there is a panel connection per group between each of the five wheel support beams 108. The group panel connectors can be either bolted to the bottom surface of a panel or the along the bottom surface of a wheel receptacle 106, and can be centered or offset from center.

The Group A panel connections 802 are bolted into the A panels only. The Group A panel connections 802 begins at the furthest left A panel and extends to the furthest right A panel. It does extend across the Group B and C panels, but it is not bolted into the Group B and C panels. This meaning that the Group A panel connection is bolted into, from left to right, the first panel, the fourth panel, and the seventh panel per set of panel connections placed between the wheel support beams 108.

Concurrently, the Group B panel connection 804 begins at the furthest left B panel and extends to the furthest right B panel. It is bolted into only the Group B panel wheel receptacles 106, although it does extend across the group A and C panels at points. This meaning that the Group B panel connection 804 is bolted into, from left to right, the second, fifth, and eighth panel wheel receptacles 106.

Finally, the Group C panel connection 806 begins at the furthest left C panel and extends to the furthest right C panel. It is bolted into only the Group C panel wheel receptacles 106, although it does extend across the group A and B panels at points. This meaning that the Group C panel connection 806 is bolted into, from left to right, the third, sixth, and ninth wheel receptacles 106.

With these panel connections that are bolted into only their designated panel Groups, it allows for the reciprocation of the panels in individual groups. This reciprocation process is accomplished through three hydraulic cylinders 910A, 910B, and 910C located between the fourth and fifth wheel support beams 108 oriented the furthest back on the wheel based reciprocating slats conveyor system. The location of the hydraulic cylinders 910 can be anywhere behind at least two panel connections, in order to allow the wheel based reciprocating slat conveyor system to function properly.

Figure 10:
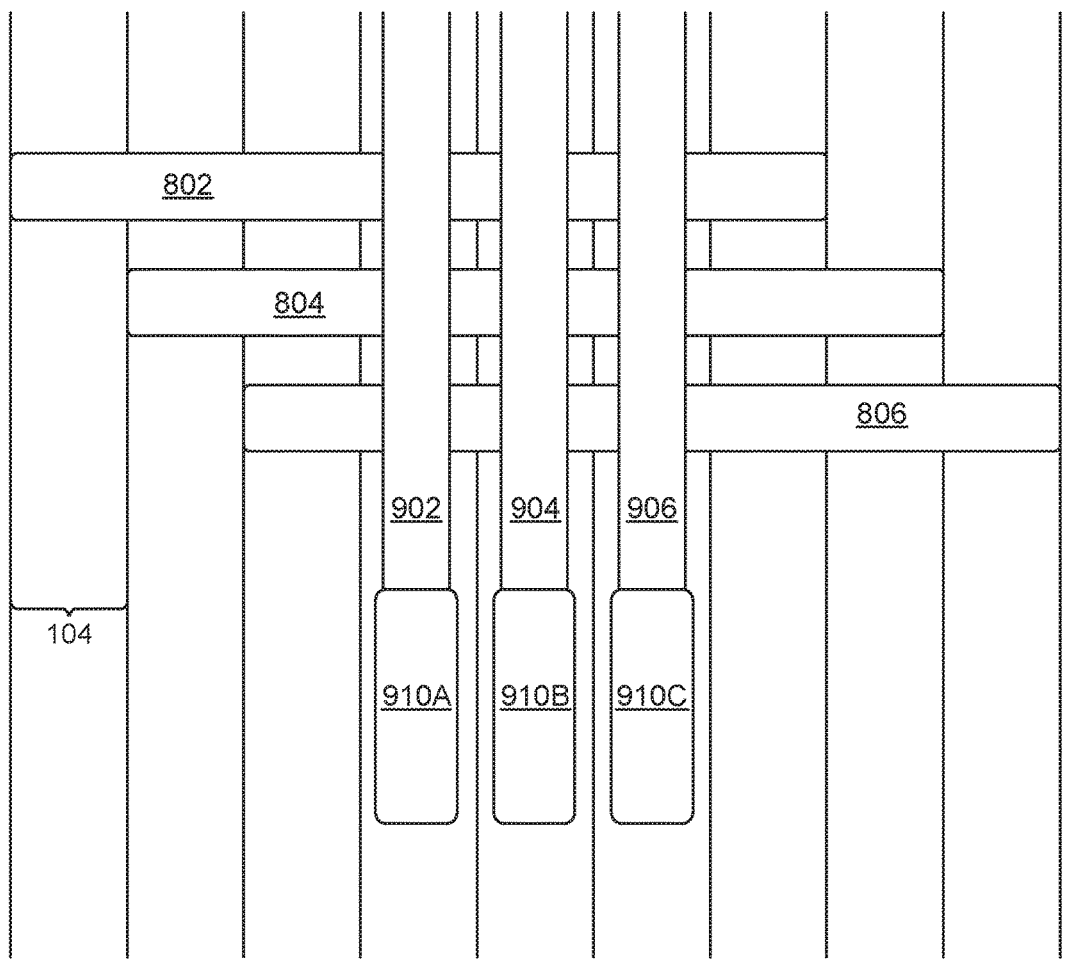
FIG. 10 is an exemplary view showing an enlarged view of the arm link to panel connection relationship.

These hydraulic cylinders 910 (910A, 910B, 910C) are attached to arm links as shown in FIG. 10 which extend the entire longitudinal, vertical distance of the panels. There may be three hydraulic cylinders 910 and three arm links to support a nine panel conveyor system. Each hydraulic cylinder 910 is affiliated with one of the three arm links, and each arm link is affiliated with one of the three panel connection groups, being either Group A, B, or C.

Therefore, there is hydraulic A 910A, hydraulic B 910B, and hydraulic C 910C, with hydraulic A 910A being linked with arm link A 902, hydraulic B 910B being linked with arm link B 904, and Hydraulic C 910C being linked with arm link C 906. This relationship is illustrated in FIG. 9.

Figure 9:
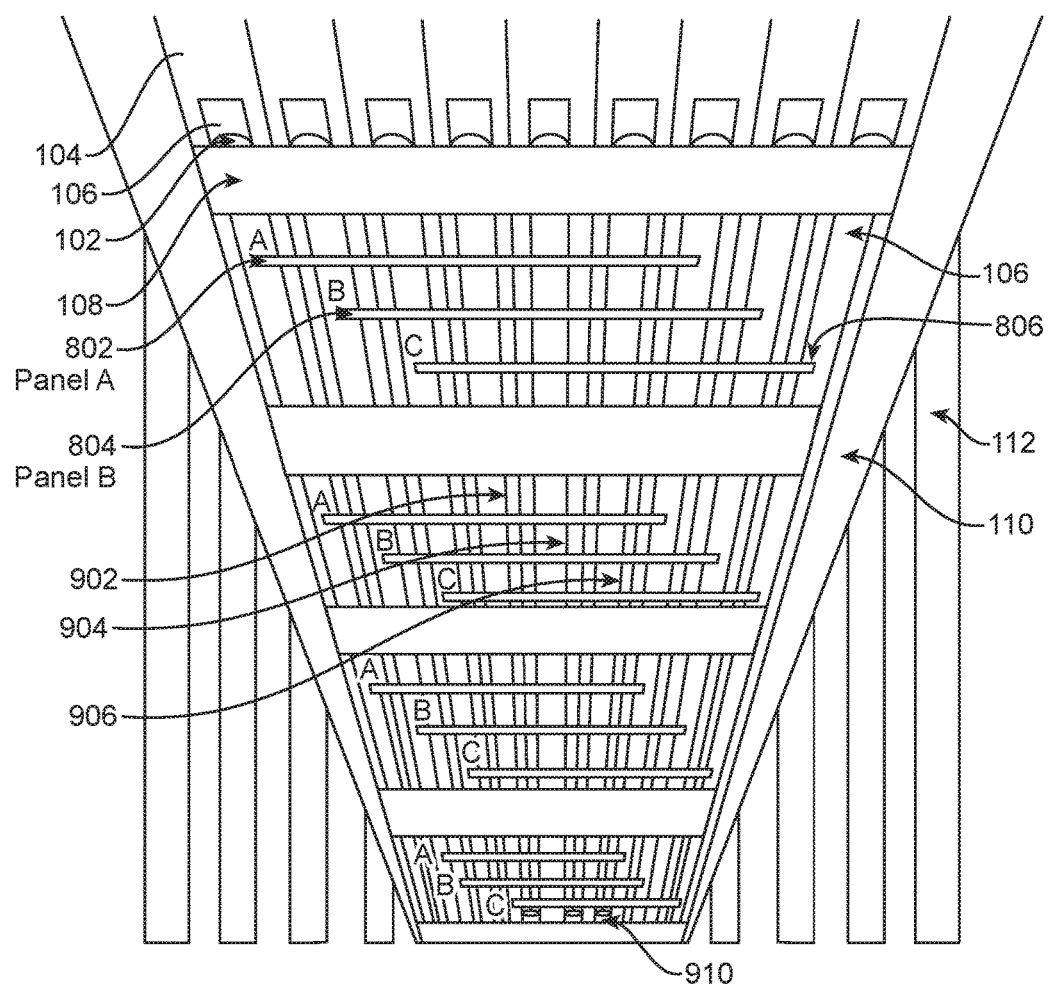
FIG. 9 is an exemplary view showing the full preferred embodiment of the reciprocating slats conveyor system, including all arm links and hydraulic cylinders.

FIG. 9 shows the arm links extending the length of the panels 104, with their base being anchored into one of the three hydraulics cylinders 910. The arm links are anchored into the three centrally located panels, and are attached to the panel connections. FIG. 9 illustrated the location of the arm links being attached to panels four, five, and six. Panel four belonging to the A Group of panels 802, panel five belonging to the B Group of panels 804, and panel six belonging to the C Group of panels 806.

Just as the panel connections will pass the panels that do not correlate to their groupings, so do the arm links pass panel connections which do not belong to their respective grouping. But, just as the panel connections do not bolt into the panels which do not correlate with their respective grouping, the arm links also do not bolt into the panel connections that do not belong to their respective grouping.

In FIG. 9, it can be seen that arm link A extends from the back, most outer left hydraulic, being hydraulic A 910A. Therefore, arm link A is the most outer left arm extension. It extends longitudinally all the way to the forward most A panel connection by means of the fourth panel from the left. As it extends upward towards the front of the panels, it is bolted into only the A panel connections 802 which it passes. Although it passes panel connections allotted to Groups B and C, it is not bolted into those panel connections, only panel connections allotted to Group A.

Moreover, in FIG. 9, it can be seen that arm link B extends from the back, center hydraulic, being hydraulic B 910B. Therefore, arm link B is the central arm extension. It extend longitudinally up all the way to the forward most B panel connection by means of the fifth panel from the left. As it extends upward towards the front of the panels, it is bolted into only the B panel connections which it passes. Although it passes panel connections allotted to Groups A and C, it is not bolted into those panel connections, only panel connections allotted to Group B.

Also in FIG. 9, it can be seen that arm link C extends from the back, most outer right hydraulic, being hydraulic C 910C. Therefore, arm link C is the most outer right arm extension. It extend longitudinally up all the way to the forward most C panel connection by means of the sixth panel from the left. As it extends upward towards the front of the panels, it is bolted into only the C panel connections which it passes. Although it passes panel connections allotted to Groups A and B, it is not bolted into those panel connections, only panel connections allotted to Group C.

FIG. 10 allows for an in depth view of the way in which the panel connections and arm links are associated. It is illustrated in FIG. 10 the way in which the panel connections are overlapped by the arm links; the arms links are also shown attached to the correlating hydraulics. It is shown that hydraulic A 910A is connected to arm link A 902, hydraulic B 910B is connected to arm link B 904, and hydraulic C 910C is connected to arm link C 906. Following, the overlapping of the arm links with the panel connections is made visible.

Figure 11:
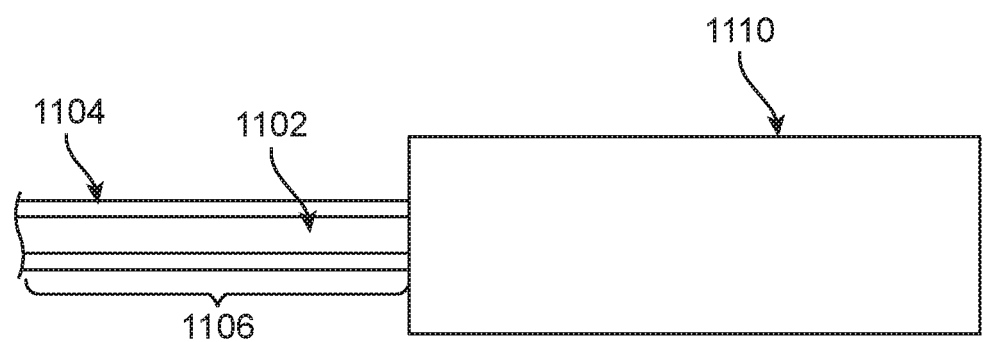
FIG. 11 is an exemplary enlarged, singular view of a hydraulic cylinder and its correlating tubed piston system.

The way in which the arm links are then attached to the hydraulic cylinders is then further illustrated through FIG. 11. FIG. 11 shows the construction of each hydraulic 910, as all three of the hydraulics are of the same construction. The hydraulic pump 1110 is a large, three-dimensional rectangle which houses the electrical and mechanical components which power the hydraulic itself. Extending from the front face, being the hydraulic face oriented towards the front of the wheel based reciprocating slats conveyor system, is the piston tube 1106.

FIG. 11 illustrates that the piston tube is in fact a series of two tubes, with one larger outer tube 1104, and one smaller inner tube 1102. The outer tube 1104 has a diameter of four inches and the inner tube 1102 has a diameter of two inches. The piston tube 1106 itself is six inches in length in order to facilitate the six inch slide which the wheels make across the top of the wheel support beams 108.

The piston outer tube 1104 remains stationary, whereas the piston inner tube 1102 is the object that provides force to propel to reciprocation of the panels 104.

Figure 12:
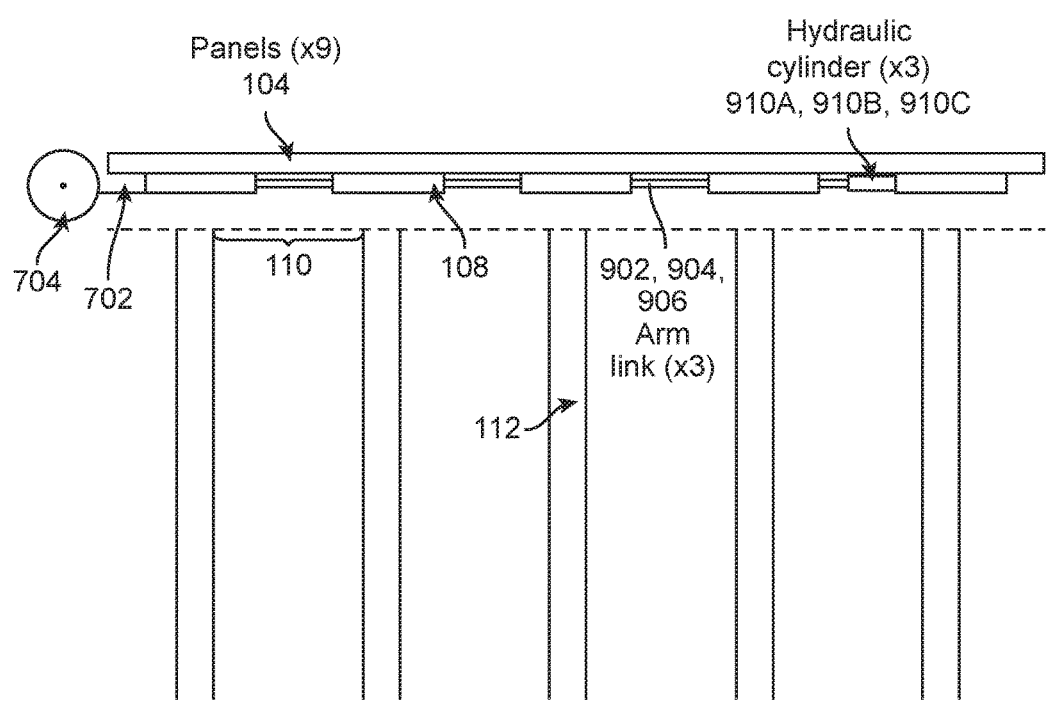
FIG. 12 is an exemplary side view of the preferred embodiment.

In FIG. 12, the preferred embodiment of the wheel based reciprocating slats conveyor system is able to be seen in completion from a side view. In order to assist the movement of cargo across the surface of the nine panels as well as assist the proper flow of collected excess melted water, the wheel based reciprocating slats conveyor system is at a slight downward slant, with the back side support beams illustrated as being taller than the front side support beams. The height of the side support beams slowly decreases as they approach the most frontward position of the wheel based reciprocating slats conveyor system in order to create the downward slant of the preferred embodiment.

The dashed lines within the illustration of FIG. 12 serves the purpose of transparency in order to view in total the components resting on the underside of the preferred embodiment, with the dash line representing the interior support beam.

Pictured is also the location of the hydraulic cylinders 910 between the fourth and fifth wheel support beams 108. The top panels 104 are seen resting above the series of support beams 112, with the arm links 902, 904, 906 and wheel receptacles 106 being visible between the wheel support beams 108 and below the panels 104.

Also in FIG. 12 is the clear positioning of the auger 704 at the face of the wheel based reciprocating slats conveyor system, with the panel drain 222 (not shown) provides a mechanism to allow excess melted water to flow towards the front primary drain 702, away from the hydraulic electrical components.

In sum, the preferred embodiment functions so that the hydraulic cylinders 910, which each maintain a correlating arm link 902, 904, 906 may push the arm links forward six inches. This is facilitate through the arm links 902, 904, 906 which are concurrently attached to panel connections 802, 804, 806 across the appropriate panel groupings of either A, B, or C, followed by these panel connections 802, 804, 806 being attached to wheel receptacles 106, which house the wheels allowing for the movement of the panels 104.

These wheels 102 reciprocate across the top of the wheel support beams 108; when hydraulic A 910A pushes arm link A forward, arm link A 902 shifts the A Group panel connections 802 forward with it, concurrently shifting Group A panels forward six inches. This shift takes place with the assistance of the wheels 102 which slide across the wheel support beams 108.

Following, hydraulic B 910B pushes arm link B 904 forward, arm link B 904 shifts the B Group panel connections 804 forward with it, concurrently shifting Group B panels forward six inches.

Lastly, hydraulic C 910C pushes arm link C 906 forward, arm link C 906 shifts the C Group panel connections 806 forward with it, concurrently shifting Group C panels forward six inches. After each panel group has undergone the collective function of shifting forward six inches, they will simultaneously relax back six inches, and continue the process in a reciprocating motion.

What is claimed is:

1. A reciprocating slat conveyor system, the system comprising:
   a plurality of parallel reciprocating slats, at least two groups of slats, of at least two slats per group, arranged in an alternating group manner having a top and bottom side;
   the top side of each of the plurality of slats having a horizontal top surface with a drain panel on at least one side;
   the bottom side of each of the plurality of slats having a wheel receptacle;
      wherein the wheel receptacle may comprise at least one wheel fitted within the wheel receptacle when resting on top of at least one set of support beams which are aligned perpendicular to the parallel slats;
      wherein, each of the at least two slats per group are connected underneath by a group panel connector and two or more group panel connectors assigned to the same group are connected by an arm link which connects to a group specific hydraulic cylinder which controls the movement of the two or more group panel connectors assigned to the same group;
      wherein the group specific hydraulic cylinder pushes and retracts an attached piston rod forward and backwards which results in corresponding wheel movement of the at least one wheel maintained above the at least one set of support beams to reciprocate one of the at least two groups of slats forward and backwards.

2. The reciprocating slat conveyor system of claim 1, wherein the wheel receptacle comprises substantially the entire length of a single slat from the plurality of slats.

3. The reciprocating slat conveyor system of claim 1, wherein the plurality of parallel reciprocating slats are arranged at a sloped angle downwards.

4. The reciprocating slat conveyor system of claim 1, wherein the drain panel on at least one side extends substantially the entire length of at least one slat from the plurality of slats.

5. The reciprocating slat conveyor system of claim 1, wherein the at least two groups of parallel reciprocating slats are affixed to a primary drain located at the front of each slat along the lower elevation.

6. The reciprocating slat conveyor system of claim 5, wherein an auger may be positioned near the primary drain to assist in the movement of cargo towards a single dispensing outlet.

7. The reciprocating slat conveyor system of claim 1, wherein the at least one set of wheel support beams are supported by at least two interior support beams which are arranged in parallel to the plurality of parallel reciprocating slats and on opposite sides of the wheel support beams.

8. The reciprocating slat conveyor system of claim 1, wherein the at least two interior support beams are supported by symmetrical side support beams on opposite ends at equidistance intervals and may comprise of decreasing elevations from the back of the conveyor system to the front in order to permit the conveyor system to be sloped downward for disposal of cargo along the conveyor system.

9. A reciprocating slat conveyor system, the system comprising:

a plurality of parallel reciprocating slats, at least two groups of slats, of at least two slats per group, arranged in an alternating group manner having a top and bottom side;

the top side of each of the plurality of slats having a horizontal top surface;

the bottom side of each of the plurality of slats having a plurality of wheel receptacles;

wherein each of the plurality of wheel receptacles may comprise a wheel that rests on top of at a support beam aligned perpendicular to the parallel slats;

wherein, each of the at least two slats per group are connected underneath by a group panel connector and two or more group panel connectors assigned to the same group are connected by an arm link which connects to a group specific hydraulic cylinder which controls the movement of the two or more group panel connectors assigned to the same group;

wherein the group specific hydraulic cylinder pushes and retracts an attached piston rod forward and backwards which results in corresponding wheel movement of the at least one wheel maintained above the at least one set of support beams to reciprocate one of the at least two groups of slats forward and backwards.

10. The reciprocating slat conveyor system of claim 9, wherein the plurality of parallel reciprocating slats are arranged at a sloped angle downwards.

11. The reciprocating slat conveyor system of claim 9, wherein the at least two groups of parallel reciprocating slats are affixed to a primary drain located at the front of each slat along the lower elevation.

12. The reciprocating slat conveyor system of claim 11, wherein an auger may be positioned near the primary drain to assist in the movement of cargo towards a single dispensing outlet.

13. The reciprocating slat conveyor system of claim 9, wherein the at least one set of wheel support beams are supported by at least two interior support beams which are arranged in parallel to the parallel reciprocating slats and on opposite sides of the wheel support beams.

14. The reciprocating slat conveyor system of claim 9, wherein the at least two interior support beams are supported by symmetrical side support beams on opposite ends at equidistance intervals and may comprise of decreasing elevations from the back of the conveyor system to the front in order to permit the conveyor system to be sloped downward for disposal of cargo along the conveyor system.

15. A reciprocating slat conveyor system, the system comprising:

a plurality of reciprocating slats, at least three groups of slats, of at least three slats per group, arranged in an alternating group manner having a top and bottom side;

the top side of each of the plurality of slats having a horizontal top surface with a drain panel on at least one side;

the bottom side of each of the plurality of slats having a horizontal bottom surface and at least two perpendicular vertical panels affixed equidistance from the center on opposite sides to the horizontal bottom surface extending substantially the entire length of one of the plurality of slats;

wherein the at least two perpendicular vertical panels affixed to the horizontal bottom surface of the plurality of slats may comprise at least one wheel fitted between the at least two perpendicular vertical panels that rests on top of at least one set of support beams aligned perpendicular to the parallel slats;

wherein, each of the at least three slats per group are connected underneath by a group panel connector and two or more group panel connectors assigned to the same group are connected by an arm link which connects to a group specific hydraulic cylinder which controls the movement of the two or more group panel connectors assigned to the same group;

wherein the group specific hydraulic cylinder pushes and retracts an attached piston rod forward and backwards which results in corresponding wheel movement of the at least one wheel maintained above the at least one set of support beams to reciprocate one of the at least three groups of slats forward and backwards.

16. The reciprocating slat conveyor system of claim 15, wherein the plurality of reciprocating slats are arranged at a sloped angle downwards towards a cargo disposal.

17. The reciprocating slat conveyor system of claim 15, wherein the plurality of parallel reciprocating slats are affixed to a primary drain located at the front of each slat along the lower elevation.

18. The reciprocating slat conveyor system of claim 17, wherein an auger may be positioned near the primary drain to assist in the movement of cargo towards a single dispensing outlet.

19. The reciprocating slat conveyor system of claim 15, wherein the at least one set of wheel support beams are supported by at least two interior support beams which are arranged in parallel to the plurality of parallel reciprocating slats and on opposite sides of the wheel support beams.

20. The reciprocating slat conveyor system of claim 15, wherein the at least two interior support beams are supported by symmetrical side support beams on opposite ends at equidistance intervals with decreasing elevations from the back of the conveyor system to the front in order to permit the conveyor system to be sloped downward for disposal of cargo along the conveyor system.

* * * * *